(No Model.)

A. W. SANBORN.
AXLE LUBRICATOR.

No. 496,325. Patented Apr. 25, 1893.

Witnesses,

Inventor,
Alden W. Sanborn
By Dewey & Co.
Attys

UNITED STATES PATENT OFFICE.

ALDEN W. SANBORN, OF SAN FRANCISCO, CALIFORNIA.

AXLE-LUBRICATOR.

SPECIFICATION forming part of Letters Patent No. 496,325, dated April 25, 1893.

Application filed March 24, 1892. Serial No. 426,284. (No model.)

*To all whom it may concern:*

Be it known that I, ALDEN W. SANBORN, a citizen of the United States, residing in the city and county of San Francisco, State of California, have invented an Improvement in Lubricators; and I hereby declare the following to be a full, clear, and exact description of the same.

My invention relates to a novel device which is especially designed for the lubrication of horizontal rotary journals.

It consists in certain details of construction which will be more fully explained by reference to the accompanying drawings, in which—

Figure 1:
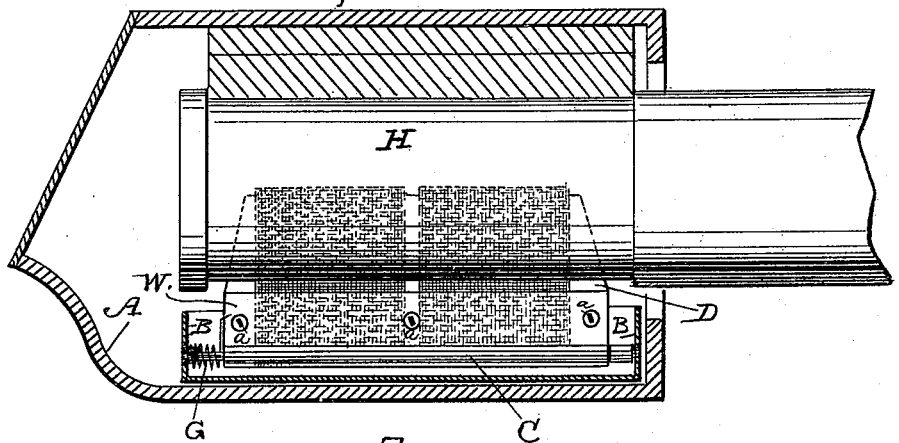
Figure 2:
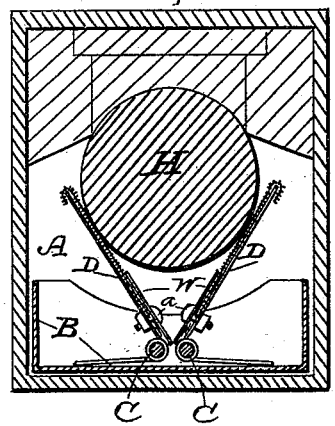
Figure 3:
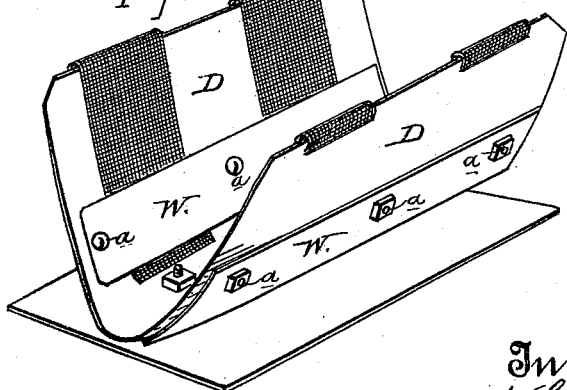

Figure 1 is a longitudinal section of my lubricator. Fig. 2 is a transverse section. Fig. 3 is a modification of the device.

A is the oil cellar or reservoir, and B is a supplemental box or frame adapted to be introduced into or removed from the reservoir beneath the shafting at will. Within this box are secured the sheet metal leaves D, the sides and upper edges of which extend up on either side of the shaft to be lubricated, and bear against it with an elastic pressure. The lower edges of these leaves are submerged or dipped into the oil within the reservoir. Sheets of wire cloth or other suitable capillary conveyers are secured to these leaves, by means of longitudinally extending clamping plates W. These plates are placed over the lower ends of the conveyers and they are bolted to the plates upon each side of the conveyers to secure the latter in place by a spring or elastic pressure. By placing the bolts *a* upon each side of the conveyers so that they do not pass through the latter, they do not injure the conveyers, which they would do if passed through the material of which the conveyers are composed, as the drawing strain upon the conveyers, due to the rubbing action of the shaft or bearing upon the upper portions of the conveyers, would cause the material to tear at the points through which the bolts passed. Being held by the elastic pressure of the clamping plates, the conveyers may be readily removed, or adjusted by the simple loosening of the bolts, and after a new conveyer is placed in position, or adjusted the bolts are again tightened to secure the parts. The conveyers are for the purpose of conveying the oil to the upper edges or the points of contact with the shaft or bearing.

The capillary conveyers may be applied to the plates in many ways to produce the desired effect, one or two of which I have here shown.

The elastic pressure of the plates upon the sides of the bearing may be produced in various ways. In Fig. 3, the plates themselves are made of sufficient elasticity to produce the requisite pressure. In Fig. 1, I have shown two plates, the lower edges of which are fixed to independent rotary shafts, and the upper edges divergent so as to press upon the sides of the shaft or bearing. Around the one end of each of the shafts C is a coiled spring G, one end of which is connected with the plate (being clamped in the present case between the sides by the holding bolts) and the other end rests upon the floor of the box, so that when the two plates are opened outwardly away from each other, the tension of the springs acts to force them together. The shaft or bearing H may be of any desired size, and the box and the lubricating plates are made of proportional size, and the opening between them is such that the shaft extends down between the plates which are caused by the springs or their own elasticity to press against the opposite sides of the shaft below the center. The reservoir contains the lubricant which also flows into the removable box containing the plates and capillary conductors by which it is carried upwardly to a point where it is delivered upon the sides of the shaft for the whole length of the bearing. This insures the continuous and proper lubrication of the shaft or bearing, prevents any dirt from being carried upward, and by means of the springs a steady, gentle pressure of the lubricating surfaces is kept against the shafts at all times. They also adjust themselves and compensate for the gradual wear of the boxes and change of position of the parts. By this construction, the carriers of the lubricant will yield sufficiently to allow the removable box in which they are fixed, to be inserted or removed from the end of the oil cellar or reservoir without blocking up the car, or in any way disturbing any of the other parts, and this is a most important feature, as it enables the workman to remove and replace the lubricating device from the oil cellar by simply removing the end cover while a car is standing upon the track, the operation occupying about a minute.

Having thus described my invention, what I claim as new, and desire to secure by Letters Patent, is—

1. A lubricator consisting of an oil reservoir, an independent removable frame therein, the yielding plates carried by said frame and having their upper edges diverging and adapted to press upon the sides of the journal, the oil conveyers extending along the inner walls of the plates to the upper edges thereof, the clamping plates placed longitudinally across the lower portions of the conveyers and bolts passing through the clamping plates and yielding plates upon each side of the conveyers for holding the clamping plates to the yielding plates and securing the conveyers by elastic or spring pressure, substantially as herein described.

2. In a lubricator, the combination with the oil cellar or reservoir containing the journal, of an independent and removable box or frame adapted to contain oil and located within the oil cellar or reservoir beneath the journal, yielding plates supported upon the removable box or frame and extending upwardly and outwardly upon opposite sides of said journal, and sheets of conducting material impervious to the lubricant, clamped to the inner surfaces of the yielding plates and extending upwardly from the oil reservoir to contact with the journal.

In witness whereof I have hereunto set my hand.

A. W. SANBORN.

Witnesses:
S. H. NOURSE,
J. A. BAYLESS.